TELEVISION SIGNAL REPRODUCER SYNCHRONIZATION
Filed Nov. 16, 1959
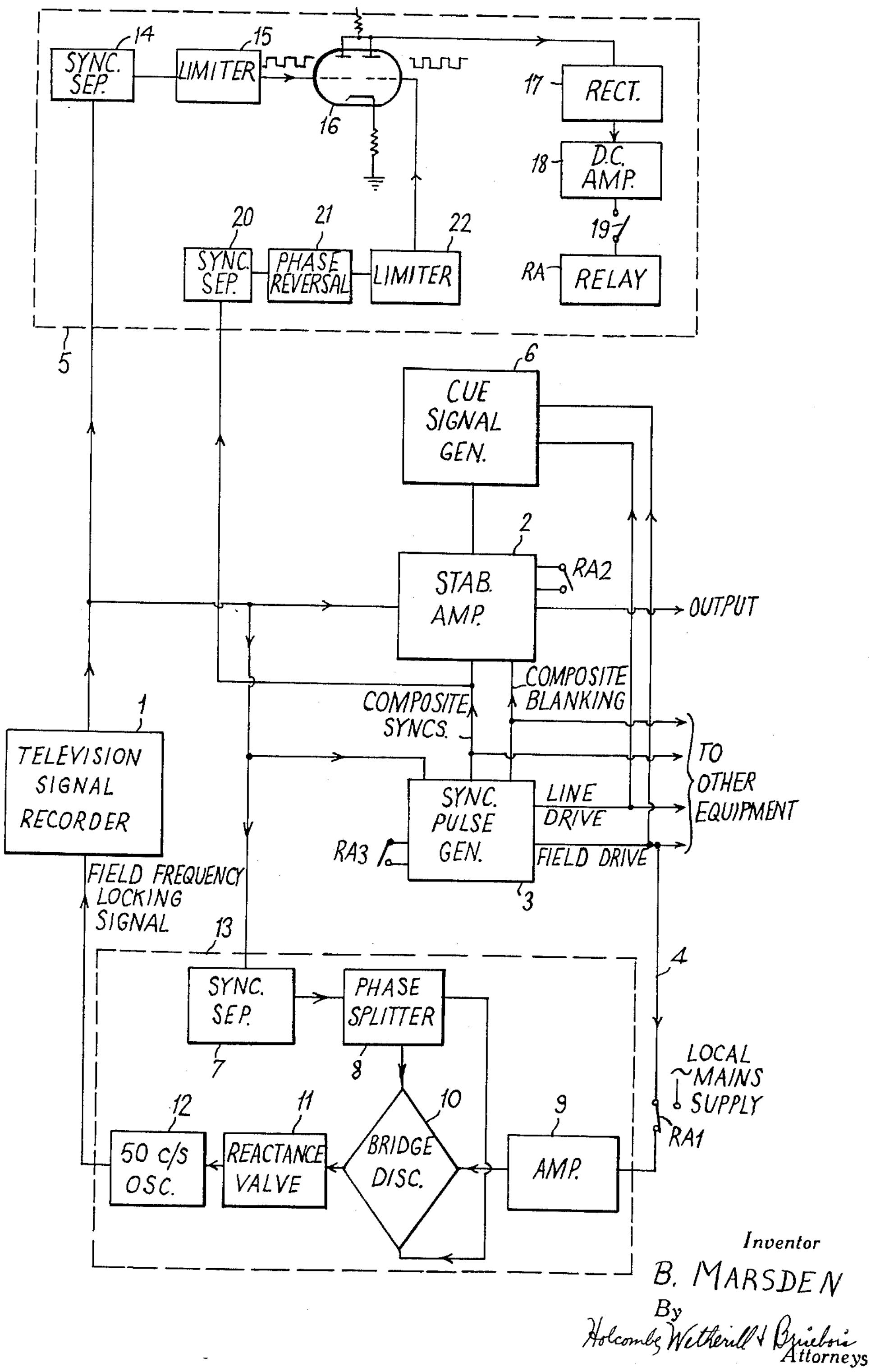
Inventor
B. MARSDEN
By
Holcombe, Wetherill & Brisebois
Attorneys United States Patent Office 3,065,296

Patented Nov. 20, 1962

3,065,296
TELEVISION SIGNAL REPRODUCER SYNCHRONIZATION

Bernard Marsden, London, England, assignor to Associated Television Limited, London, England, a company of Great Britain Filed Nov. 16, 1959, Ser. No. 853,044
Claims priority, application Great Britain Nov. 19, 1958
12 Claims. (Cl. 178—69.5)

The present invention relates to apparatus for producing television programmes and more particularly to television apparatus including one or more television signal recording machines which can reproduce a complete recorded television waveform consisting of video signals and synchronising signals which may be used to form the whole or part of the material for a television programme. Television signal recording machines as at present employed generally comprise magnetic recorders in which the complete television waveform is recorded magnetically on a record carrier, usually a tape, and means are provided for reproducing the signals from the record carrier.

It will be apparent that with such apparatus the television waveform is not reproduced until the machine is set in operation and that therefore no synchronising signals are present until the television waveform including video information is being reproduced from the machine. Moreover, any synchronising signals reproduced by the machine when it is first switched on will not be at the correct repetition rate until the machine has run up to speed. Certain disadvantages result from this lack of synchronising signals prior to the operation of the television signal recording machine to reproduce the recorded information. Normally with other television equipment which produces signals to form part of a television programme, such as television studio cameras, telecine equipment or the like, a constant train of synchronising signals is produced from these devices even when no video information is present and the equipment is not actively producing programme material. Consequently with such devices, prior to the start of a programme or part of a programme employing a particular camera or telecine equipment, cueing information or identification information can be transmitted and moreover the train of synchronising pulses from a particular piece of equipment to be brought into use are brought into coincidence with the synchronising signals from other equipment in use, or alternatively one can be slaved to the other, so that the video information from the different equipments can be smoothly combined or interchanged in the programme without loss of synchronism in the final television waveform leaving the studio. However, in the case of television signal recorders, since no synchronising signals are obtained prior to the reproduction of signals from the recorder, and since when it reaches normal running speed it is not necessarily coincidentally synchronised with other equipment, it is not possible to obtain cueing information from the recorder, nor is it possible to mix the signals from the recorder with other signals to allow a smooth change between different sources of video signals.

These disadvantages are particularly troublesome at stations using recorded television signals either as complete recorded programmes to be smoothly integrated with other material, or as recorded inserts which are to be mixed within the framework of a complete programme being produced by other equipment. In such cases the reception of cueing information and synchronous signals from the source of the recorded signals prior to the use of video information from that source is essential if an integrated programme is to be distributed from the station receiving the recorded signals, and if undesirable intervals or lack of synchronisation is to be avoided in the final television waveform sent out from that station.

It is therefore an object of the present invention to provide means whereby the aforementioned disadvantages are substantially reduced or avoided and which enables output signals from a television signal recorder to be more readily integrated into a television programme in combination with other television signals forming a part of the programme and produced by other apparatus. It will be understood that the term "television signal recorder" includes any machine which can reproduce a complete television waveform as electric signals from a recording medium, irrespective of whether the signals were recorded on the medium by that machine.

According to the present invention a synchronising pulse generator is associated with the television signal recorder and is arranged so that it can produce a train of synchronising pulses representative of the recorder synchronising waveform, both when the recorder is reproducing a signal and not reproducing a signal, the arrangement being such that when the television signal recorder is operative to reproduce a television waveform the synchronising pulse generator is slaved to the synchronising pulses in the television waveform produced by the recorder, whereby the synchronising pulses from the synchronising pulse generator are coincident with the synchronising pulses of the television waveform from the recorder.

According to a feature of the invention the output from the television signal recorder and from the synchronising pulse generator are fed to a stabilising amplifier the output of which forms the signal for inclusion in a television programme. The arrangement is such that when the recorder is switched on to reproduce its television waveform, a signal at field frequency is fed to the recorder to cause the machine to run up to a final speed at which the field synchronising signals of the synchronising pulse generator and the field synchronising signals of the complete television waveform from the recorder are in phase. The synchronising pulses in the television waveform from the recorder are then compared with the synchronising waveform from the synchronising pulse generator and an indication is produced when the line synchronising pulses of the two synchronising pulse waveforms are substantially coincident. This in turn causes the synchronising pulse generator to be slaved to the synchronising waveform of the television signal from the recorder such that the synchronising waveforms are then exactly coincident.

According to a further feature of the invention the stabilizing amplifier operates to remove the synchronising pulses in the complete television waveform from the recorder and to substitute the synchronising pulses from the synchronising pulse generator. This has the advantage of reducing the noise content of the final television waveform output from the stabilising amplifier since any noise present on the output signal from the recorder during blanking and synchronising pulse periods is removed. In this way improved synchronisation of picture monitors and other equipment is obtained. Furthermore any interruption of the complete waveform emanating from the video recorder only results in a disturbance of the video component on subsequent picture reproducing equipment, due to the addition of separate continuous synchronising signals which are arranged to continue even during disturbance periods.

In order that the invention may be more fully understood reference will now be made to the accompanying drawing wherein the single FIGURE shows a block diagram of one circuit arrangement according to this invention.

Referring to the drawing, a television signal recorder, comprising a magnetic tape recorder, is shown at 1. The reproduced output from the recorder 1 consists of a composite television waveform of video signals and synchronising and blanking signals which is fed into a stabilising amplifier 2. In the stabilising amplifier the incoming video signal from the recorder is removed from its composite synchronising signals and added to synchronising pulses locally generated in a synchronising pulse generator 3. In order to achieve this, the incoming television waveform from the recorder must be synchronous with the synchronising signals in the local synchronising pulse generator 3. This generator is arranged to deliver a constant train of synchronising signals to the stabilising amplifier, which although unbroken may be phase displaced from the norm or reference position as will be later described.

The manner in which synchronism between the television waveform reproduced from the video tape recorder and the synchronising pulses generated in the synchronising pulse generator 3 is achieved will now be described. With the video tape recorder quiescent, the video output of the stabilising amplifier 3 is muted by the open contacts RA2 of relay RA i.e. the output from the stabilising amplifier consists of black level and continuously generated synchronising signals from the synchronising pulse generator 3. Upon actuation of the tape recorder 1, to reproduce a recorded television signal, the field synchronising signal from the pulse generator 3 is fed over line 4 and through the relay contact RA1 into the comparator 13 where it is compared with the field synchronising signal from the recorder in order to produce exact field coincidence between the output of the recorder 1 and the synchronising pulse generator 3.

The apparatus comprising the comparator 13 operates as follows. A complete television waveform from the recorder 1 is fed into a synchronising pulse separator 7 from the output of which issues a field synchronising signal. This is fed into a phase splitter 8 which produces two equal outputs of opposite polarity. These two signals are fed into opposite arms of a bridge discriminator 10, whilst into the third input terminal is fed a field drive signal from the synchronising pulse generator 3 via amplifier 9. The function of the bridge discriminator 10 is to produce a D.C. signal indicative of the difference in phase between the field synchronising signal from the television recorder 1 and that from the synchronising pulse generator 3. The D.C. voltage from the discriminator 10 operates a reactance valve 11 in parallel with an oscillator 12. The output of the oscillator is caused to lock the television signal recorder 1. It will thus be seen that if the polarity of the error voltage issuing from discriminator 10 is phased correctly, the 50 cycle oscillator 12 can be caused to move up or down in frequency in such a manner as to produce exact field coincidence between the output of the television signal recorder and the synchronising generator. It may be noted that when the television recorder is at rest the 50 cycle oscillator 12 will automatically move to the highest limit of its frequency swing, since the information from the bridge discriminator 10 is indicating that the field frequency coming from the television recorder is much lower than that issuing from the synchronising generator 3. In fact, under these conditions the television recorder is at rest and producing zero cycles per second field frequency.

The use of the apparatus forming comparator 13 takes care of any phase differences that may arise when using the equipment and discretely adjusts the frequency and phase of the locking signal to produce exact coincidence of the field component arriving back at the stabilising amplifier 2 and synchronising generator 3.

When substantially stable running speed of the recorder is achieved, a comparator 5 compares the composite synchronising signal emanating from the recorder with that emanating from the synchronising pulse generator 3 and an output is produced to actuate the relay RA and cause the synchronising pulse generator 3 to become slaved to the composite synchronising waveform emanating from the recorder at an instant when line synchronising pulses in the two waveforms are coincident. Slaving can be achieved by any one of a variety of known methods, most of which rely upon the alteration of the master oscillator frequency in the generator 3 to bring the synchronising waveform output into synchronism with that of another source.

The comparator 5 operates as follows. The composite synchronising signal issuing from the television recorder 1 when running, is fed into synchronising pulse separator 14 which removes the video component completely. The synchronising signal is fed into limiter 15, which squares off the synchronising pulse waveform and limits the amplitude to a predetermined level. Similarly, composite synchronising pulses from the synchronising generator 3 are passed into a synchronising pulse separator 20, a phase reversal device 21 and a limiter 22. The two signals from limiters 15 and 22 are fed to the grids of the double triode stage 16 and consist of two identical synchronising waveforms, equal in amplitude but opposite in polarity, by virtue of the phase reversal affected in stage 21. By reason of the cathode and anode coupling in stage 16, a waveform will appear at the input of rectifier 17, which is a mixture of the two waveforms fed to stage 16. When the two incoming waveforms have either differing frequency or phase components an A.C. waveform will be present, but when the two incoming waveforms are identical in frequency and exactly in phase with each other, the two signals will cancel in stage 16, and the input to rectifier 17 will be at the minimum level. If, therefore, it is arranged that relay RA operated by the D.C. amplifier 18, is non-operative when the A.C. waveform is present from stage 16, and then operates in the absence of a waveform, i.e. when the two synchronising input waveforms to stage 16 are coincident, the relay contact RA3 will be caused to close at an instant in time when the two waveforms are exactly in phase, to slave the generator 3 to the output of the television signal recorder 1. After the generator has been caused to slave to the output of the recorder, relay RA will remain operated by virtue of the maintenance of synchronisation between the recorder and the synchronising generator.

Reverting to the comparator 13, it will be understood that when the recorder 1 is made to run up to speed, approximate field synchronisation will be achieved almost instantaneously, but due to the time constant existing between the discriminator 10 and the reactance valve 11 a certain amount of hunting will take place. In other words, the signal from the television recorder and from the synchronising pulse generator will more or less have their fields in phase, but with a variation about exact line by line synchronisation, due to the action of the discriminator and reactance valve. It is during one of the times of exact coincidence that relay RA is caused to operate. Since the frequency and phase difference between the output of the recorder 1 and the output of the synchronising pulse generator 3 is of an extremely small order, more or less instantaneous slaving will be effected with the minimum amount of disturbance of the output of the stabilising amplifier 2. It is thus seen that if the synchronising generator 3 is used to drive other equipment used in the television installation, little or no disturbance of the driving pulses going to that equipment will occur.

The relay RA also includes changeover contact RA1 which is necessary to drive the television recorder 1 from the local power supply locking signal during the periods when the synchronising generator is slaved to the television recorder. During the run up period of the television recorder, the recorder is driven by the output of the synchronising generator. If contact RA1 was not included a closed loop would be present which would produce an effect whereby the synchronising generator would attempt to slave to itself via the television recorder.

As mentioned previously, when relay RA is not energised, contact RA2 is open and the video amplifiers in stabilising amplifier 2 are inoperative. When relay RA operates contact RA2 is closed and the video input to the stabilising amplifier is permitted to pass through to the output. The output signal from the stabilising amplifier thus consists of a train of synchronising signals generated by the generator 3 and combined with the video information recorded on the video tape recorder 1.

When the recorder 1 is switched off, it is necessary to interlock the "off" control of the recorder with relay RA, through switch 19, such that a time delay ocurs between the operation of the "off" control and the actual stopping of the machine. It is necessary for the "off" control to first of all disconnect relay RA, causing contact RA3 to open and the synchronising generator to deslave from the incoming signal and revert to normal mains lock before the cessation of the video waveform from the television recorder. It is thus seen that in practice when replaying a television recording, the "off" control is pressed before the actual end of the recording on the tape. Should, however, the recorder 1 break down, or there be a failure of apparatus such as to upset relay RA, the operation of relay RA will cause the cessation of the slaving of the synchronising generator from the output of the recorder and it reverts to normal mains lock.

A further signal may be injected into the stabilising amplifier from a cue signal generator 6. This permits some appropriate identification signal to be inserted on the signal leaving the stabilising amplifier to permit remote stations to identify signals from the recorder, and to distinguish signals reproduced by one recorder from signals reproduced by another.

The output of the cueing generator 6 fed into the stabilising amplifier can be automatically disconnected once the picture from the recorder is passing from the output of the stabilising amplifier, or may be left on, as desired.

The above described arrangement has many applications. In one application remote recipients of a recorded programme, e.g. other television stations, can identify before the start of a programme, or a part of a programme, that the recorded signal source to which they are connected is the correct one, and can receive from that signal source a continuous train of synchronising pulses, prior to the reproduction of the video signals to which they can slave or lock. In this way they can smoothly integrate te signals from the recorder into whatever other television signals are being distributed immediately prior to the signals from the recorder without loss of synchronisation in the outgoing transmitted or distributed signals. Moreover in the event of a disturbance of the output of the recorder such as may happen due to a technical fault or failure of the recording medium, then the train of synchronising signals leaving the stabilising amplifier 2 are not disturbed, and thus the minimum amount of picture disturbance is noted by viewers of the programme. If the recorder breaks down the synchronising pulse generator reverts to locking from the mains supply and the comparator becomes inoperative.

In another application where the recorder is located adjacent to other studio equipment such as telecine equipment and cameras, it is possible for the recorded signals to be mixed with the other signals by virtue of the automatic synchronism achieved. It will be noted that the synchronising pulse generator associated with the recorder can also be the generator controlling the other studio equipment.

Whilst a particular embodiment has been described it will be understood that various modifications may be made without departing from the scope of this invention. Thus where more than one television signal recorder is employed, a separate synchronising pulse generator, stabilising amplifier and comparator may be provided for each recorder or, alternatively, one group of such apparatus may be selectively connectable to more than one recorder. Moreover although the invention has been particularly described as employed with a video magnetic tape recorder it may also be employed with any other type of television signal recorder which can reproduce a complete television waveform as electric signals from a recording medium. Furthermore, the comparators 5 and 13 may be constructed in various other ways besides that specifically described.

I claim:

1. Television apparatus comprising a television signal recorder which can reproduce a complete recorded television waveform consisting of video signals and synchronising signals, a synchronising pulse generator which can produce a train of synchronising pulses representative of the recorder synchronising waveform both when the recorder is reproducing a signal and not reproducing a signal, a first comparator circuit for comparing the field synchronising pulses from the synchronising pulse generator and the field synchronising pulses from the television signal recorder, a second comparator circuit for comparing the complete synchronising pulse waveform from the synchronising pulse generator and the complete synchronising pulse waveform from the television signal recorder and means operated by the output of said second comparator circuit for slaving the synchronising pulse generator to the synchronising pulses in the television waveform reproduced by the recorder when the synchronising pulses from the synchronising pulse generator are coincident with the synchronising pulses of the television waveform from the recorder.

2. Apparatus as claimed in claim 1 in which the first comparator circuit includes a discriminator in which field synchronising signals from the synchronising pulse generator are compared with the field synchronising signals in the waveform reproduced from the recorder, an oscillator at field frequency controlled by the output of said discriminator, and means for feeding the output of the oscillator to control the recorder.

3. Apparatus as claimed in claim 1, in which the second comparator circuit includes a comparator stage which produces an A.C. output signal which varies in magnitude according to the phase difference between the two sets of synchronising signals fed thereto.

4. Apparatus as claimed in claim 3, including a rectifier to which the A.C. waveform from the comparator stage is fed and a relay controlled by the output of the rectifier, the contacts of said relay in turn controlling the switching of a circuit so that the synchronising pulse generator is slaved to the synchronising waveform of the television signal from the recorder.

5. Apparatus as claimed in claim 4, in which the relay includes contacts to switch the television signal recorder to be synchronised from the local power supply when the synchronising pulse generator is slaved to the synchronising waveform of the television signal recorder.

6. Television apparatus comprising a television signal recorder which can reproduce a complete recorded television waveform consisting of video signals and synchronising signals, a synchronising pulse generator which can produce a train of synchronising pulses representative of the recorded synchronising waveform both when the recorder is reproducing a signal and not reproducing a signal, means for feeding a signal at field frequency to the recorder to cause said recorder to run up to a final speed at which the field synchronising signals of the synchronising pulse generator and the field synchronising signals of the complete television waveform from the recorder are in phase, a comparator circuit for comparing the complete synchronising pulse waveform from the synchronising pulse generator and the complete synchronising pulse waveform from the television signal recorder and means operated by the output of said comparator circuit for slaving the synchronising pulse generator to the synchronising pulses in the television waveform reproduced by the recorder when the synchronising pulses from the synchronising pulse generator are coincident with the synchronising pulses of the television waveform from the recorder.

7. Apparatus as claimed in claim 6, including a stabilising amplifier and means for feeding the output from the television signal recorder and from the synchronising pulse generator to said stabilising amplifier.

8. Apparatus as claimed in claim 6, in which said stabilising amplifier includes means for removing the synchronising pulses from the complete television waveform fed from the recorder and means for adding to said waveform synchronising pulses from the synchronising pulse generator.

9. Television apparatus comprising a television signal recorder which can reproduce a complete recorded television waveform consisting of video signals and synchronising signals, a synchronising pulse generator which can produce a train of synchronising pulses representative of the recorder synchronising waveform both when the recorder is reproducing a signal and not reproducing a signal, a first comparator circuit for comparing the field synchronising pulses from the synchronising pulse generator and the field synchronising pulses from the television signal recorder, said first comparator circuit comprising a discriminator in which said two sets of field synchronising pulses are compared, an oscillator at field frequency controlled by the output of said discriminator and means for feeding the output of said oscillator to said television signal recorder a second comparator circuit for comparing the complete synchronising pulse waveform from the synchronising pulse generator and the complete synchronising pulse waveform from the television signal recorder, said second comparator circuit comprising a comparison stage which produces an A.C. output signal which varies in magnitude according to the phase difference between the two sets of synchronising signals fed thereto, a rectifier fed by said A.C. output signal and means operated by the output from said rectifier for slaving the synchronising pulse generator to the synchronising pulses in the television waveform reproduced by the recorder when the synchronising pulses from the synchronising pulse generator are coincident with the synchronising pulses of the television waveform from the recorder.

10. Apparatus as claimed in claim 9, in which the means operated by the output of the rectifier comprises a relay having contacts controlling the oscillator in said synchronising pulse generator.

11. Television apparatus comprising a television signal recorder which can reproduce a complete recorded television waveform consisting of video signals and synchronising signals, a synchronising pulse generator which can the recorder synchronising waveform both when the reproduce a train of synchronising pulses representative of corder is reproducing a signal and not reproducing a signal, a first comparator circuit for comparing the field synchronising pulses from the synchronising pulse generator and the field synchronising pulses from the television signal recorder, means for deriving an output from said first comparator circuit to synchronise the drive of the recorder, a second comparator circuit for comparing the complete synchronising pulse waveform from the synchronising pulse generator and the complete synchronising pulse waveform from the television signal recorder and means operated by the output of said second comparator circuit for slaving the synchronising pulse generator to the synchronising pulses in the television waveform reproduced by the recorder when the synchronising pulses from the synchronising pulse generator are coincident with the synchronising pulses of the television waveform from the recorder, said means operated by the output from said second comparator circuit also switching the drive of said recorder to be synchronised from a local power supply.

12. Television apparatus comprising a television signal recorder which can reproduce a complete recorded television waveform consisting of video signals and synchronising signals, a synchronising pulse generator which can produce a train of synchronising pulses representative of the recorder synchronising waveform both when the recorder is reproducing a signal and not reproducing a signal, a first comparator circuit for comparing the field synchronising pulses from the synchronising pulse generator and the field synchronising pulses from the television signal recorder, means for deriving an output from said first comparator circuit to synchronise the drive of the recorder, a second comparator circuit for comparing the complete synchronising pulse waveform from the synchronising pulse generator and the complete synchronising pulse waveform from the television signal recorder, means operated by the output of said second comparator circuit for slaving the synchronising pulse generator to the synchronising pulses in the television waveform reproduced by the recorder when the synchronising pulses from the synchronising pulse generator are coincident with the synchronising pulses of the television waveform from the recorder, a stabilising amplifier to which the output of the recorder and the output of the synchronising pulse generator are fed and means included in said stabilising amplifier for removing the synchronising pulses from the television output signal of the recorder and substituting synchronising pulses from the synchronising pulse generator.

References Cited in the file of this patent

UNITED STATES PATENTS

| | | |
|---|---|---|
| 2,655,556 | Abelson | Oct. 13, 1953 |
| 2,704,307 | Gillette | Mar. 15, 1955 |
| 2,720,555 | Krause | Oct. 11, 1955 |
| 2,752,423 | Pugsley | June 26, 1956 |
| 2,892,017 | Houghton | June 23, 1959 |
| 2,907,818 | Wetzel | Oct. 6, 1959 |